United States Patent

Yoshida

(10) Patent No.: US 12,366,056 B2
(45) Date of Patent: Jul. 22, 2025

(54) WORK CONTROL METHOD, WORK CONTROL SYSTEM, WORK CONTROL APPARATUS, AND NON-TRANSITORY COMPUTER READABLE MEDIUM STORING WORK CONTROL PROGRAM

(71) Applicant: NEC Corporation, Tokyo (JP)

(72) Inventor: Hiroshi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 250 days.

(21) Appl. No.: 18/020,984

(22) PCT Filed: Jul. 16, 2021

(86) PCT No.: PCT/JP2021/026844
§ 371 (c)(1),
(2) Date: Feb. 13, 2023

(87) PCT Pub. No.: WO2022/064823
PCT Pub. Date: Mar. 31, 2022

(65) Prior Publication Data
US 2023/0287660 A1    Sep. 14, 2023

(30) Foreign Application Priority Data
Sep. 28, 2020 (JP) .................. 2020-161974

(51) Int. Cl.
*E02F 9/00* (2006.01)
*E02F 9/26* (2006.01)
(52) U.S. Cl.
CPC .................. *E02F 9/265* (2013.01)

(58) Field of Classification Search
None
See application file for complete search history.

(56) References Cited

U.S. PATENT DOCUMENTS 4,773,025 A * 9/1988 Penkar ............... G05B 19/416
                                                  700/261
4,893,254 A * 1/1990 Chan ................. B25J 9/1607
                                                  700/263

(Continued)

FOREIGN PATENT DOCUMENTS

JP    H07-292708 A    11/1995
JP    H10-259618 A     9/1998

(Continued)

OTHER PUBLICATIONS

International Search Report for PCT Application No. PCT/JP2021/026844, mailed on Oct. 12, 2021.

*Primary Examiner* — Jonathan M Dager

(57) ABSTRACT

A work control method according to the present invention includes a construction machine control step (S1) of driving a movable part of a construction machine based on a first input value input for each process cycle that is periodically repeated; a posture detection step of detecting the position of the movable part as a posture detection value; a feedback input value computation step of computing a second input value that reduces an error between a target value of the movable part and the posture detection value; and an input value correction step of correcting a second input value by a correction amount computed based on the first input value and an estimated value of an arrival time for the movable part to reach the target value for each process cycle.

15 Claims, 11 Drawing Sheets

(56) References Cited

U.S. PATENT DOCUMENTS

| | | | | |
|---|---|---|---|---|
| 5,160,239 A * | 11/1992 | Allen | E02F 9/26 | 700/65 |
| 5,363,304 A * | 11/1994 | Awano | E02F 9/2004 | 701/50 |
| 5,903,988 A * | 5/1999 | Tochizawa | E02F 3/437 | 701/50 |
| 5,953,838 A * | 9/1999 | Steenwyk | E02F 9/2025 | 701/50 |
| 5,968,104 A * | 10/1999 | Egawa | E02F 9/26 | 701/50 |
| 6,140,787 A * | 10/2000 | Lokhorst | E02F 9/26 | 701/50 |
| 6,317,669 B1 * | 11/2001 | Kurenuma | E02F 3/438 | 701/50 |
| 6,968,264 B2 * | 11/2005 | Cripps | E02F 3/435 | 701/50 |
| 8,065,060 B2 * | 11/2011 | Danko | G05B 13/021 | 701/50 |
| 8,135,518 B2 * | 3/2012 | Budde | E02F 9/265 | 701/50 |
| 8,200,398 B2 * | 6/2012 | Sahlin | E02F 3/847 | 701/50 |
| 8,311,710 B2 * | 11/2012 | Budde | E02F 9/265 | 701/50 |
| 8,527,158 B2 * | 9/2013 | Faivre | E02F 9/265 | 701/50 |
| 8,577,564 B2 * | 11/2013 | Stanek | E02F 3/435 | 701/50 |
| 8,644,964 B2 * | 2/2014 | Hendron | E02F 9/265 | 700/20 |
| 8,731,784 B2 * | 5/2014 | Hayashi | E02F 3/7609 | 172/810 |
| 9,109,345 B2 * | 8/2015 | Okamura | E02F 9/2207 | |
| 9,304,501 B2 * | 4/2016 | Danko | G05B 13/041 | |
| 9,464,410 B2 * | 10/2016 | Johnson | E02F 3/434 | |
| 9,644,346 B2 * | 5/2017 | Seki | E02F 3/435 | |
| 9,739,038 B2 * | 8/2017 | Baba | E02F 9/262 | |
| 9,752,298 B2 * | 9/2017 | Nakamura | E02F 9/265 | |
| 10,120,369 B2 * | 11/2018 | Taylor | E02F 9/2037 | |
| 10,459,462 B2 * | 10/2019 | Beschorner | G01S 17/86 | |
| 10,494,788 B2 * | 12/2019 | Glasser | E02F 9/121 | |
| 10,738,439 B2 * | 8/2020 | Mairet | E02F 3/432 | |
| 10,760,245 B2 * | 9/2020 | Morita | E02F 9/265 | |
| 10,870,968 B2 * | 12/2020 | Kean | G05B 15/02 | |
| 11,168,458 B2 * | 11/2021 | Shimizu | E02F 9/26 | |
| 11,204,254 B2 * | 12/2021 | Gonzalez | E02F 9/20 | |
| 11,222,202 B2 * | 1/2022 | Kean | G06F 18/217 | |
| 11,634,887 B2 * | 4/2023 | Kim | E02F 3/435 | 701/50 |
| 11,697,917 B2 * | 7/2023 | Myers | E02F 9/265 | 701/50 |
| 11,746,504 B2 * | 9/2023 | Takaoka | E02F 3/841 | 701/50 |
| 11,781,292 B2 * | 10/2023 | Nishimura | E02F 9/205 | 701/300 |
| 2003/0001751 A1 * | 1/2003 | Ogura | E02F 9/2296 | 340/425.5 |
| 2004/0267404 A1 * | 12/2004 | Danko | E02F 3/438 | 700/245 |
| 2005/0004734 A1 * | 1/2005 | Cripps | E02F 3/435 | 701/50 |
| 2005/0080495 A1 * | 4/2005 | Tessier | B64C 13/0421 | 700/63 |
| 2006/0245896 A1 * | 11/2006 | Alshaer | E02F 9/2029 | 414/685 |
| 2007/0168100 A1 * | 7/2007 | Danko | B25J 9/1628 | 701/50 |
| 2008/0097672 A1 * | 4/2008 | Clark | E02F 3/437 | 701/50 |
| 2008/0282583 A1 * | 11/2008 | Koellner | E02F 9/264 | 37/348 |
| 2009/0204259 A1 * | 8/2009 | Danko | G05B 13/024 | 700/250 |
| 2009/0228177 A1 * | 9/2009 | Mintah | E02F 9/26 | 701/50 |
| 2009/0319133 A1 * | 12/2009 | Ekvall | F15B 21/087 | 701/50 |
| 2010/0138180 A1 * | 6/2010 | Sugihara | B25J 9/163 | 702/145 |
| 2011/0029206 A1 * | 2/2011 | Kang | E02F 9/2075 | 701/50 |
| 2016/0369480 A1 * | 12/2016 | Mizuochi | F15B 13/06 | |
| 2017/0089033 A1 * | 3/2017 | Matsuyama | E02F 9/2285 | |
| 2019/0226175 A1 * | 7/2019 | Mairet | E02F 3/422 | |
| 2020/0024828 A1 * | 1/2020 | Asada | E02F 3/437 | |
| 2020/0032483 A1 * | 1/2020 | Ready-Campbell | E02F 9/2045 | |
| 2020/0172384 A1 * | 6/2020 | Cadou | B66F 9/0655 | |

FOREIGN PATENT DOCUMENTS

| | | |
|---|---|---|
| JP | 2019-201545 A | 11/2019 |
| WO | 2016/035898 A1 | 3/2016 |

* cited by examiner

WORK CONTROL METHOD, WORK CONTROL SYSTEM, WORK CONTROL APPARATUS, AND NON-TRANSITORY COMPUTER READABLE MEDIUM STORING WORK CONTROL PROGRAM This application is a National Stage Entry of PCT/JP2021/026844 filed on Jul. 16, 2021, which claims priority from Japanese Patent Application 2020-161974 filed on Sep. 28, 2020, the contents of all of which are incorporated herein by reference, in their entirety.

TECHNICAL FIELD

The present invention relates to a work control method, a work control system, a work control apparatus, and a non-transitory computer readable medium storing a work control program, and in particular, to a work control method, a work control system, a work control apparatus, and a non-transitory computer readable medium storing a work control program for controlling a construction machine.

BACKGROUND ART

In recent years, a number of unmanned controls for construction machines have been proposed. For example, Patent Literature 1 and 2 disclose techniques regarding control of construction machines.

An apparatus disclosed in Patent Literature 1 sets a monitoring point for each of a boom, an arm, and a bucket, sets an entry prohibited area, computes an amount of change in an output value from a current output value and the previous output value of a boom angle sensor and an arm angle sensor by a microcomputer, and further computes a predicted time for each monitoring point to reach the entry prohibited area based on the height of the current monitoring point. When it is determined that the predicted time obtained from this computation is smaller than a predetermined time set in advance, the degree of deceleration is obtained and the obtained value is multiplied by the current operation speed of an actuator to decelerate the actuator. Further, when one of the monitoring points reaches the entry prohibited area, the actuator is stopped.

An apparatus disclosed in Patent Literature 2 is an apparatus that controls an electric motor driven by output of an inverter circuit, in which the apparatus generates a plurality of time-series voltage patterns that can be output by the inverter circuit and smooths each of the time-series voltage patterns as a time-series smooth voltage pattern. Then, the apparatus predicts, for each of the plurality of time-series smooth voltage patterns, the value of a predetermined physical amount regarding a control target of the electric motor when the time-series smooth voltage pattern is input to the electric motor as a predicted value, selects the time-series smooth voltage pattern that corresponds to the highest-rated predicted value, and controls the inverter circuit so as to output the selected time-series smooth voltage pattern.

CITATION LIST

Patent Literature

[Patent Literature 1] Japanese Unexamined Patent Application Publication No. H07-292708
[Patent Literature 2] Japanese Unexamined Patent Application Publication No. 2019-201545

SUMMARY OF INVENTION

Technical Problem

In a work control of a construction machine, it has been required to achieve both an increase in the speed of an operation and suppression of an amount of overshoot for a scheduled range of motion of a movable part. With Patent Literature 1 and 2, however, it is difficult to achieve both of them.

Solution to Problem

An aspect of a work control method according to the present invention includes: a construction machine control step of driving a movable part of a construction machine based on a first input value input for each process cycle that is periodically repeated; a posture detection step of detecting the position of the movable part as a posture detection value; a feedback input value computation step of computing a second input value that reduces an error between a target value of the movable part and the posture detection value; and an input value correction step of correcting the second input value by a correction amount computed based on the first input value and an estimated value of an arrival time for the movable part to reach the target value for each process cycle.

An aspect of a work control system according to the present invention includes: a construction machine control unit configured to drive a movable part of a construction machine based on a first input value input for each process cycle that is periodically repeated; a posture detection unit configured to detect the position of the movable part as a posture detection value; a feedback input value computation unit configured to compute a second input value that makes the error between the target value of the movable part and the posture detection value smaller; and an input value correction unit configured to correct the second input value by a correction amount computed based on the first input value and an estimated value of an arrival time for the movable part to reach the target value for each process cycle.

An aspect of a work control apparatus according to the present invention includes: a construction machine control unit configured to drive a movable part of a construction machine based on a first input value input for each process cycle that is periodically repeated; a posture detection unit configured to detect the position of the movable part as a posture detection value; a feedback input value computation unit configured to compute a second input value that makes the error between the target value of the movable part and the posture detection value smaller; and an input value correction unit configured to correct the second input value by a correction amount computed based on the first input value computed in a pre-process cycle and an estimated value of an arrival time for the movable part to reach the target value.

An aspect of a non-transitory computer readable medium storing a work control program according to the present invention is a non-transitory computer readable medium storing a work control program executed by feedback control means of a work control system including: construction machine control means for driving a movable part of a construction machine based on a first input value input for each process cycle that is periodically repeated; posture detection means for detecting the position of the movable part as a posture detection value; feedback control means for generating the first input value by feedback control based on the posture detection value, in which the work control program performs: feedback input value computation processing for computing a second input value that reduces an error between a target value of the movable part and the posture detection value; and input value correction processing for correcting the second input value by a correction amount computed based on the first input value computed in a pre-process cycle and an estimated value of an arrival time for the movable part to reach the target value.

Advantageous Effects of Invention

According to a work control apparatus and a non-transitory computer readable medium storing a work control program of the present invention, it is possible to achieve both an increase in the speed of an operation and suppression of an amount of overshoot for a scheduled range of motion of a movable part.

EXAMPLE EMBODIMENT

Figure 1:
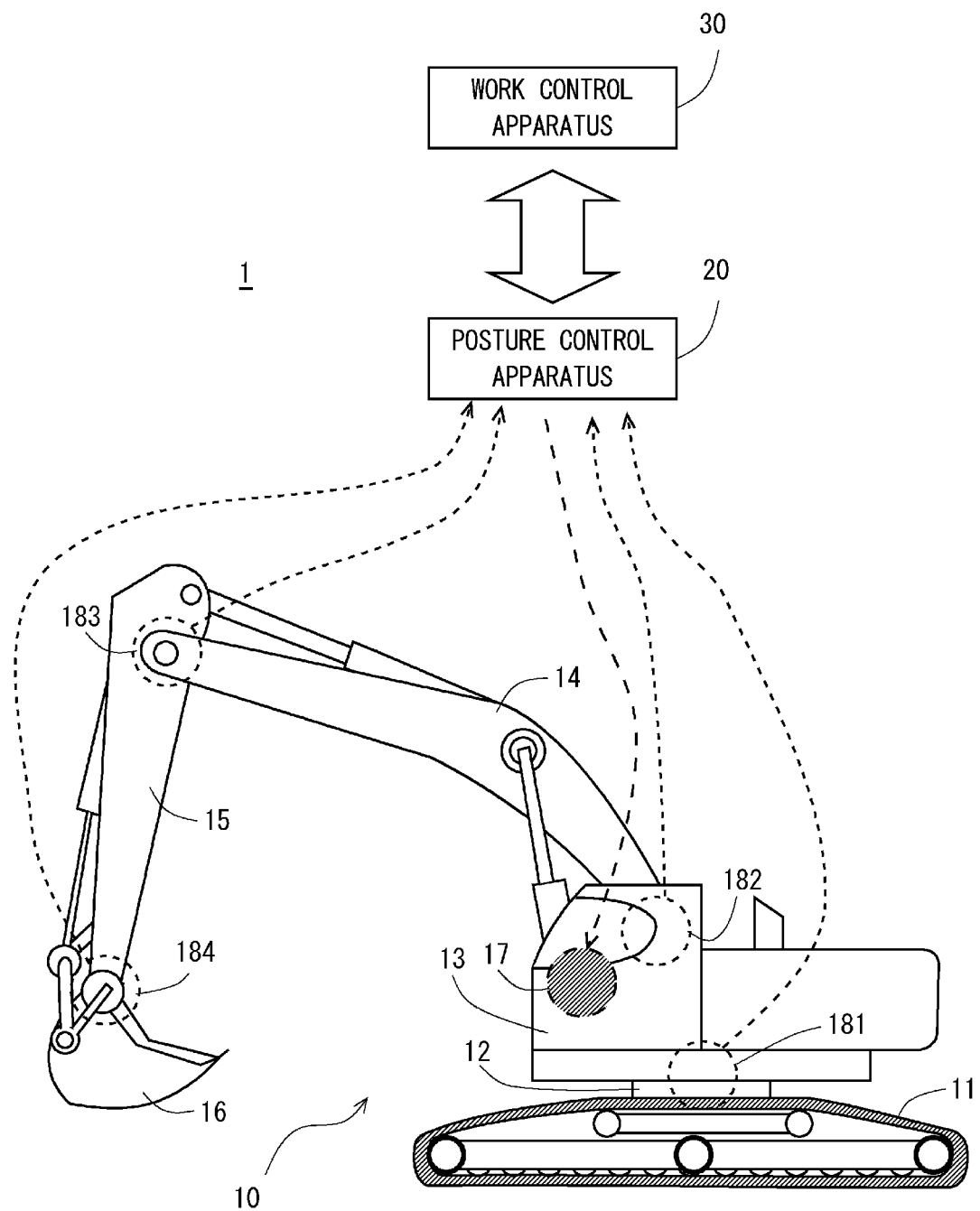
FIG. 1 is a schematic view of a work control system according to a first example embodiment.

For clarity of explanation, the following descriptions and drawings will be appropriately omitted and simplified. Further, the respective components described in the drawings as functional blocks which perform various kinds of processing can be configured by Central Processing Units (CPUs), memories or other circuits in terms of hardware, and are achieved by programs loaded in memories, or the like in terms of software. Accordingly, it will be understood by those skilled in the art that these functional blocks can be implemented in various forms by only hardware, only software or a combination thereof. They are not limited to any of them. Incidentally, in the respective drawings, the same components are denoted by the same reference numerals, and dual description will be omitted as needed.

Further, the above-described program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

First Example Embodiment

Hereinafter, with reference to the drawings, example embodiments of the present invention will be described. A work control method, a work control system, and a work control apparatus of a construction machine described below control a construction machine that drives movable parts by a hydraulic pressure, a motor or the like. The following description will be made taking a backhoe as an example of the construction machine. Further, while a work control system in which process blocks that perform work control processing are arranged in a plurality of places in a distributed manner via a network will be described in the following description, a work control apparatus in which the process blocks included in the work control system are formed of one apparatus may be employed. Further, the content of the control performed in the work control system will be referred to as a work control method. Specific examples thereof will be described later in detail.

Further, the work control apparatus that will be described later may be applied to a machine having a manipulation lever that can be operated by a worker as a construction machine or may be applied to a machine that directly controls a drive mechanism using, for example, an electromagnetic proportional valve by an electrical signal without using a manipulation lever.

FIG. 1 shows a schematic view of a work control system 1 according to the first example embodiment. A construction machine 10 shown in FIG. 1 is a backhoe. The construction machine 10 includes a crawler 11, a turning base 12, a cockpit 13, a boom 14, an arm 15, and a bucket 16. The crawler 11 is a caterpillar for moving the construction machine 10. The turning base 12 turns a chassis on which the cockpit 13, the boom 14 and the like are mounted. The cockpit 13 is a manipulation room in which a manipulation lever and the like for manipulating the posture of the construction machine 10 are disposed. Further, while the drawings are in a simplified form, in the work control system 1, a construction machine drive processing unit 17 is disposed in the construction machine 10. Further, each of the boom 14, the arm 15, and the bucket 16 corresponds to a movable part and is operated by a hydraulic cylinder. This hydraulic cylinder is elongated or contracted by an action of the construction machine drive processing unit 17. Note that the part that corresponds to the movable part includes, for example, besides the hydraulic cylinder, a part that is driven by the motor.

Further, in the work control system 1 according to the first example embodiment, posture sensors 181-184 for detecting posture angles are attached to the movable parts of the construction machine 10. In the example shown in FIG. 1, the posture sensor 181 detects the rotation angle of the turning base 12, the posture sensor 182 detects the current angle of the boom 14, the posture sensor 183 detects the relative angle of the boom 14 and the arm 15, and the posture sensor 184 detects the relative angle of the arm 15 and the bucket 16.

In the work control system 1 according to the first example embodiment, a posture control apparatus 20 and a work control apparatus 30 that correspond to the construction machine 10 are provided. The posture control apparatus 20 provides instructions for moving the construction machine drive processing unit 17. The posture control apparatus 20 further generates a posture detection value based on the information on the angles acquired from the posture sensors 181-184. The work control apparatus 30 generates a control input value for deciding the posture of the construction machine 10 based on the information obtained from the posture control apparatus 20.

In the work control system 1 according to the first example embodiment, the feedback control input value is provided for the construction machine drive processing unit 17 of the construction machine 10, thereby moving the movable parts such as the boom 14 of the construction machine 10. Then, the work control system 1 according to the first example embodiment performs correction on a temporary input value (hereinafter this value will be referred to as a second input value) generated by the feedback control using the target value and the posture detection value and thus computes an input value provided for the construction machine 10 (hereinafter this value will be referred to as a first input value). In the following description, the work control system 1 according to the first example embodiment will be described in detail.

Figure 2:
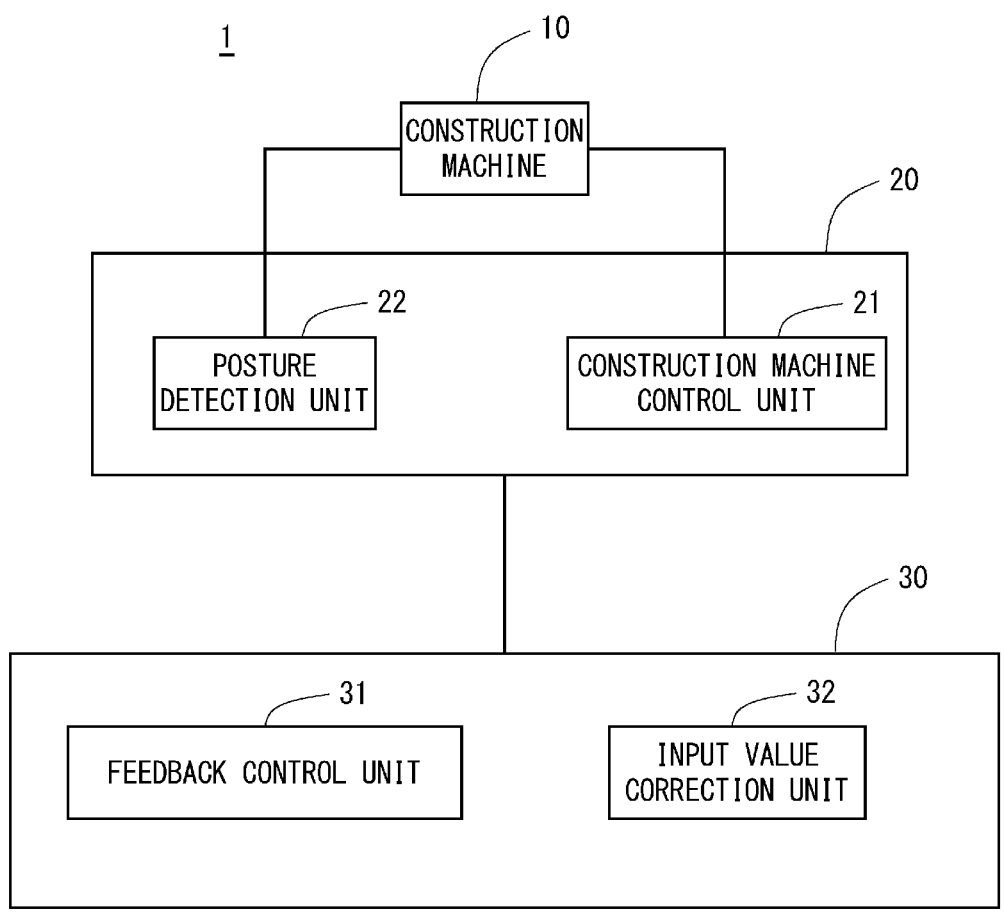
FIG. 2 is a schematic block diagram of the work control system according to the first example embodiment.

First, a configuration of a process block of the work control system 1 according to the first example embodiment will be described. FIG. 2 shows a schematic block diagram of the work control system according to the first example embodiment. The construction machine 10 is shown in FIG. 2 as a target to be controlled by the work control system 1. In the example shown in FIG. 2, the posture control apparatus 20 is provided with a construction machine control unit 21 and a posture detection unit 22. The work control apparatus 30 is provided with a feedback control unit 31 and an input value correction unit 32. Then the construction machine 10 is manipulated using the posture control apparatus 20 and the work control apparatus 30. The example shown in FIG. 2 is merely one example. For example, the posture control apparatus 20 and the work control apparatus 30 may be integrated as one apparatus and the construction machine 10 and the posture control apparatus 20 may be connected to each other by communication. Further, the posture control apparatus 20 may be provided in such a way that the posture control apparatus 20 and the construction machine 10 are integrated with each other to obtain a form in which the posture control apparatus 20 and the work control apparatus 30 are connected to each other by communication. Further, the construction machine 10 is a target to be controlled by the work control apparatus 30 and the posture control apparatus 20 may be an interface for allowing the work control apparatus 30 to actually operate the construction machine 10. In this case, it can be considered that the work control apparatus 30 is a main part of the work control system 1.

The posture control apparatus 20 includes a construction machine control unit 21 and a posture detection unit 22. The work control apparatus 30 operates the construction machine drive processing unit 17 based on the first input value computed for each process cycle that is periodically repeated, whereby the construction machine control unit 21 displaces each of the movable parts of the construction machine 10. That is, the construction machine control unit 21 is a work control processing unit that performs a construction machine control step of driving the movable parts of the construction machine based on the first input value.

The posture detection unit 22 acquires the joint angles of the respective movable parts from the posture sensors 181-184 provided in the movable parts such as the arm of the construction machine 10 and outputs the acquired joint angles as posture detection values indicating the posture of the construction machine 10. That is, the posture detection unit 22 is a posture detection processing unit configured to perform a posture detection step of detecting the positions of the movable parts as posture detection values. The posture detection unit 22 acquires joint angles of the respective movable parts from the posture sensors 181-184 provided in the movable parts such as the arm of the construction machine 10 and outputs the acquired joint angles as posture detection values indicating the posture of the construction machine 10. That is, the posture detection unit 22 is a posture detection processing unit configured to perform a posture detection step of detecting the positions of the movable parts as posture detection values.

The work control apparatus 30 includes a feedback control unit 31 and an input value correction unit 32. The feedback control unit 31 generates the second input value by PID control or the like using the posture detection value. This second input value, which is a value before the correction made by the input value correction unit 32 that will be described later is applied, functions as the first input value provided for the construction machine control unit 21 when the input value correction unit 32 is not used. The input value correction unit 32 executes an input value correction step of correcting the second input value by a correction amount computed based on the first input value and the estimated value of the arrival time for the movable part to reach the target value for each process cycle.

The aforementioned first input value may be generated for each of the movable parts of the construction machine 10 or may include a first input value for a plurality of movable parts. It is further assumed that the work control system 1 computes the first input value (or the second input value) using parameters that are different from each other for each movable part.

Figure 3:
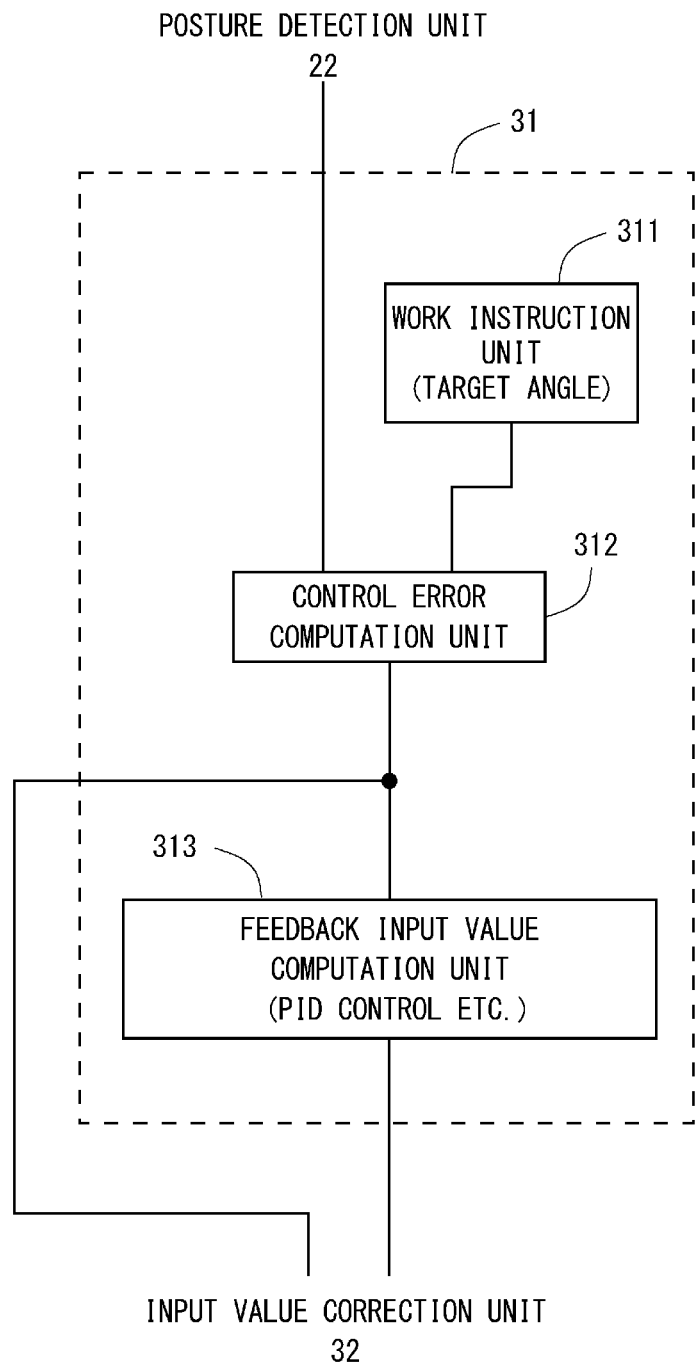
FIG. 3 is a block diagram of a feedback control unit according to the first example embodiment.

Next, a more detailed configuration of the work control system 1 according to the first example embodiment will be described. FIG. 3 shows a block diagram of the feedback control unit 31 of the work control system 1 according to the first example embodiment.

The feedback control unit 31 performs predetermined arithmetic processing such as PID control on the posture detection value output from the posture detection unit 22 to generate a second input value u'(t) that reduces an error e between the posture detection value and the target value. The input value correction unit 32 performs correction processing on the second input value u'(t) to compute a first input value u(t) to be provided for the construction machine control unit 21.

Now, the feedback control unit 31 will be described in detail. The feedback control unit 31 includes a work instruction unit 311, a control error computation unit 312, and a feedback input value computation unit 313. The work instruction unit 311 outputs a target angle, which is a target value of the posture detection value for each movable part of the construction machine 10. The work instruction unit 311 outputs different target angles in accordance with the content of the work of the construction machine 10. The control error computation unit 312 executes an error computation step of computing the error e between the posture detection value output from the posture detection unit 22 and the target value including the target angle output from the work instruction unit 311. The feedback input value computation unit 313 executes a feedback input value computation step of computing the second input value u'(t) that minimizes the error e.

Figure 4:
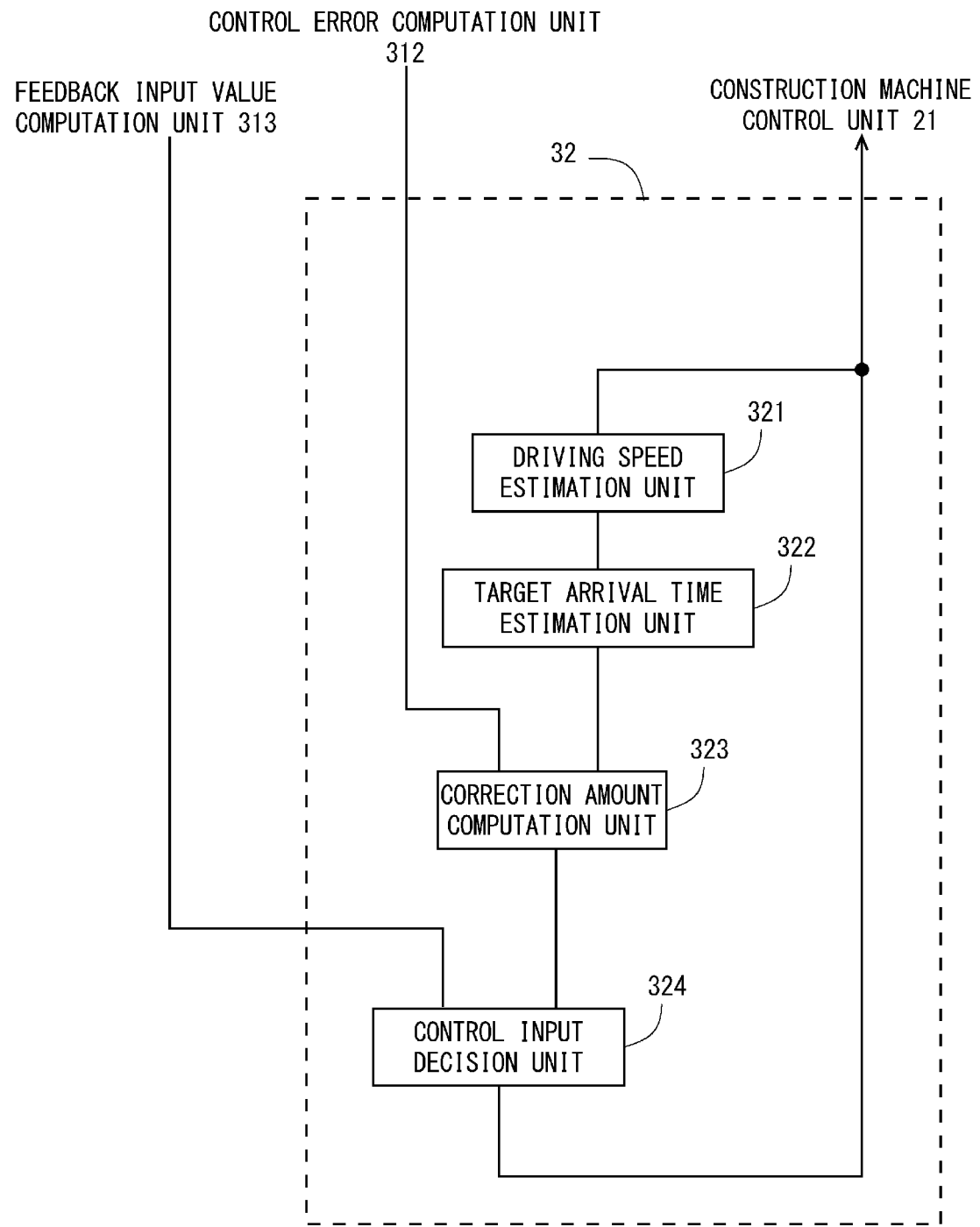
FIG. 4 is a block diagram of an input value correction unit according to the first example embodiment.

The input value correction unit 32 computes the first input value by applying the correction value to the second input value u'(t). The input value correction unit 32 will be described with reference to FIG. 4. FIG. 4 is a detailed block diagram of the input value correction unit according to the first example embodiment. As shown in FIG. 4, the input value correction unit 32 includes a driving speed estimation unit 321, a target arrival time estimation unit 322, a correction amount computation unit 323, and a control input decision unit 324.

The driving speed estimation unit 321 executes a driving speed estimation processing step of estimating the driving speed of the movable part based on the first input value u(t) computed in the pre-process cycle and the maximum moving speed of the movable part. The driving speed estimation unit 321 executes a target arrival time estimation processing step of estimating the arrival time for the posture detection value of the movable part to reach the target value based on the estimated value of the driving speed. The correction amount computation unit 323 executes a correction amount computation step of computing the correction amount that suppresses the second input value based on an estimated value of the arrival time. While the details will be described later, the correction amount computation unit 323 performs drive time rate computation processing and correction amount decision processing. In the drive time rate computation processing, a drive time rate for computing the rate of the estimated value of the arrival time to the convergence maximum time set for the movable part is computed. In the correction amount decision processing, the correction amount is decided based on the product of a drive time rate, a preset suppression rate, and the magnitude of the range of change in the first input value. The control input decision unit 324 applies the correction amount computed by the correction amount computation unit 323 to the second input value u'(t) to decide the first input value u(t) to be provided for the construction machine control unit 21.

Figure 5:
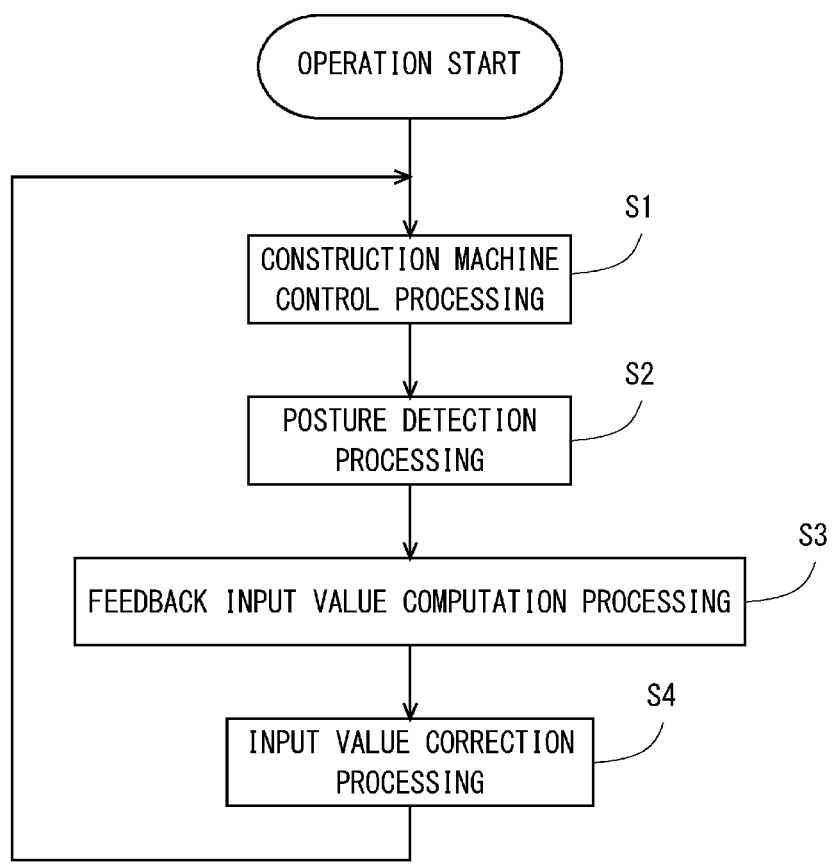
FIG. 5 is a flowchart for describing an operation of the work control system according to the first example embodiment.

Next, an operation of the work control system 1 according to the first example embodiment will be described. FIG. 5 shows a flowchart for describing the operation of the work control system 1 according to the first example embodiment. The processing in the following description corresponds to the steps of the control method. As shown in FIG. 5, in the work control system 1 according to the first example embodiment, first, the construction machine control unit 21 performs construction machine control processing for controlling the construction machine 10 based on the first input value (Step S1). Next, the posture detection unit 22 generates a posture detection value using the angle values acquired from the posture sensors 181-184 attached to the respective movable parts of the construction machine 10 (Step S2).

Next, the work control system 1 computes the second input value u'(t) that reduces the error e between the target value of the movable part and the posture detection value by the control error computation unit 312 and the feedback input value computation unit 313 (Step S3). When the symbol indicating the order of the process cycle is denoted by t, the target value is denoted by $\theta_r$, and the posture angle is denoted by $\theta$, this error e can be expressed as shown in Expression (1).

[Expression 1]

$$e(t) = \theta_r - \theta \quad (1)$$

It is assumed here that the minimum value of the second input value u'(t) is zero and the maximum value thereof is a preset maximum input value. Then, the feedback input value computation unit 313 computes a value obtained by adding a preset minimum input value to a value obtained by multiplying the difference between the error e and a preset allowable error amount by a preset gain value as the second input value u'(t).

This second input value u'(t) is computed using, for example, Expressions (2) and (3). Expression (2) shows a control gain $K_p$ in the feedback control performed by the work control system 1. By performing the computation in Expression (3) using this control gain $K_p$, the second input value u'(t) is computed.

[Expression 2]

$$Kp = \frac{u_{max} - u_{th}}{e_{max} - e_{th}} \quad (2)$$

In Expression (2), $u_{th}$, which is a value indicating that the construction machine does not operate with a first input value equal to or smaller than this value, is referred to as a minimum input amount. The symbol $u_{max}$, which is a value indicating that the construction machine 10 has a dangerous posture with a first input value equal to or larger than this value, is referred to as a maximum input amount. The symbol eth is an allowable error amount, which is an index where it can be determined that the construction machine 10 has reached the target position if the error e is within this value. The symbol $e_{max}$ is a maximum input error amount indicating an index indicating the amount of error that generates the maximum input amount.

[Expression 3]

$$u'(t) = \begin{cases} 0 & (e(t) < e_{th}) \\ K_p(e(t) - e_{th}) + u_{th} & (e_{th} \leq e(t) \leq e_{max}) \\ u_{max} & (e(t) > e_{max}) \end{cases} \quad (3)$$

Figure 6:
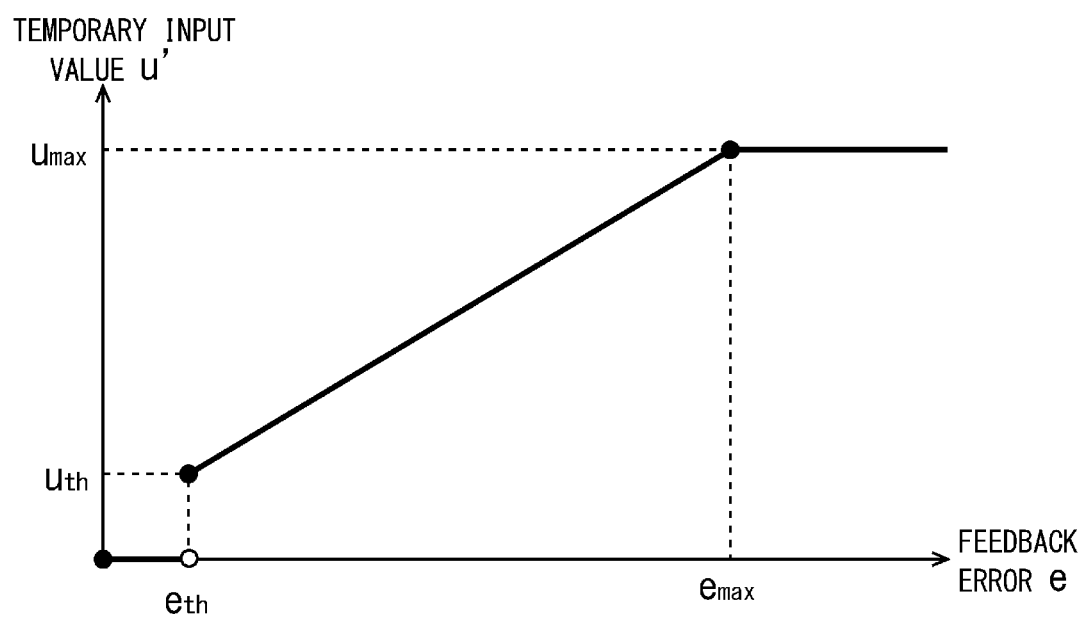
FIG. 6 is a graph for describing characteristics of a second input value generated in the work control system according to the first example embodiment.

FIG. 6 shows a graph for describing characteristics of the second input value u'(t) generated in the work control system 1 according to the first example embodiment. As shown in FIG. 6, the second input value u'(t) becomes zero when the error e is smaller than the allowable error amount eth and becomes the maximum input amount $u_{max}$ when the error e is equal to or larger than the maximum input error amount $e_{max}$. Then, the second input value u'(t) is a value between the minimum input amount $u_{th}$ and the maximum input amount $u_{max}$ in a period in which the error e is equal to or larger than the allowable error amount eth and equal to or smaller than the maximum input error amount $e_{max}$, and has a magnitude in accordance with the magnitude of the error e.

Figure 7:
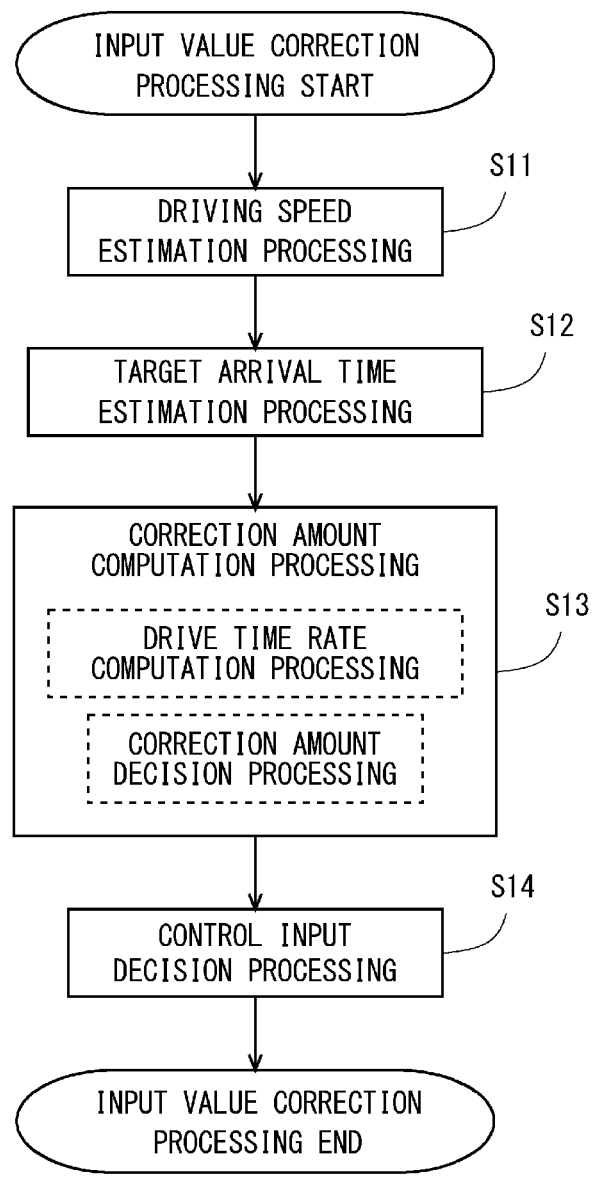
FIG. 7 is a flowchart for describing an operation of an input value correction unit according to the first example embodiment.

Next, in the work control system 1 according to the first example embodiment, the input value correction unit 32 corrects the second input value by a correction amount computed based on the first input value u(t) and the estimated value of the arrival time for the movable part to reach the target value for each process cycle (Step S4). Here, the input value correction processing in Step S4 will be described with reference to FIG. 7. FIG. 7 is a flowchart for describing an operation of the input value correction unit 32 according to the first example embodiment.

As shown in FIG. 7, in the input value correction unit 32, the driving speed estimation unit 321 first performs driving speed estimation processing for estimating the driving speed of the movable part based on the first input value u(t) in the pre-process cycle and the maximum moving speed of the movable part (Step S11). In the driving speed estimation processing, input value rate computation processing and angular velocity estimation processing are performed. In the input value rate computation processing, the rate of the given first input value u(t) in the range of change in the first input value is computed. Specifically, in the input value rate computation processing, the input value rate r(t) is computed based on Expression (4).

[Expression 4]

$$r(t) = \max\left(\frac{u(t) - u_{th}}{u_{max} - u_{th}}, 0\right) \quad (4)$$

It is seen from Expression (4) that the maximum value of the input smooth value r(t) is 1 and the minimum value thereof is 0.

In the angular velocity estimation processing, the angular velocity in the current process cycle is estimated by performing linear approximation from the angular velocity $v_{max}$ at the maximum input. That is, in the angular velocity estimation processing, the angular velocity is estimated without using a specific model. In this angular velocity estimation processing, the angular velocity v(t) is computed using, for example, Expression (5).

[Expression 5]

$$v(t) = v_{max} r(t) \quad (5)$$

Next, in the input value correction unit 32, in the target arrival time estimation unit 322, target arrival time estimation processing for estimating the arrival time for the posture detection value of the movable part to reach the target value based on the estimated value of the driving speed is performed (Step S13). In this target arrival time estimation processing, time for the posture detection value to reach the target value if it is assumed that the construction machine 10 continues to proceed at the estimated angular velocity is estimated. Specifically, the estimated value τ(t) of the arrival time to the target is computed based on Expression (6). The symbol ε in Expression (6) is a small value for avoiding divisions by zero.

[Expression 6]

$$\tau(t) = \frac{e(t)}{v(t) + \epsilon} \quad (6)$$

Next, in the correction amount computation unit 323, the input value correction unit 32 performs correction amount computation processing for computing the correction amount that suppresses the second input value based on the estimated value of the arrival time (Step S14). The correction amount computation unit performs drive time rate computation processing and correction amount decision processing. In the drive time rate computation processing, a drive time rate for computing the rate of the estimated value of the arrival time to the convergence maximum time set for the movable part is computed. As the drive time rate, the rate of the estimated value τ of the arrival time to the maximum drive time $\tau_{max}$, which is a parameter indicating the maximum value of the drive time, is computed. The drive time rate ξ can be expressed by Expression (7).

[Expression 7]

$$\xi(t) = \max\left(\frac{\tau_{max} - \tau(t)}{\tau_{max}}\right) \quad (7)$$

From Expression (7), the drive time rate ξ becomes 1 when the estimated value τ of the arrival time is zero and becomes zero when the estimated value τ of the arrival time exceeds the maximum drive time $\tau_{max}$.

In the correction amount decision processing, the correction amount s(t) is decided based on the product of the drive time rate ξ, a preset suppression rate ρ, and the magnitude of the range of change in the first input value. More specifically, the correction amount s(t) is computed based on Expression (8). Note that the suppression rate ρ is a parameter that decides the degree of suppression of the second input value by a value smaller than 1.

[Expression 8]

$$s(t) = \rho(u_{max} - u_{th})\xi(t) \quad (8)$$

Next, the input value correction unit 32 corrects the second input value u'(t) using the correction amount s(t) computed in Step S14 and the control input decision unit 324 decides the first input value u(t) in the current process cycle. Specifically, in the correction amount decision processing, the first input value u(t) is decided based on Expression (9).

[Expression 9]

$$u(t) = u'(t) - s(t) \quad (9)$$

Figure 8:
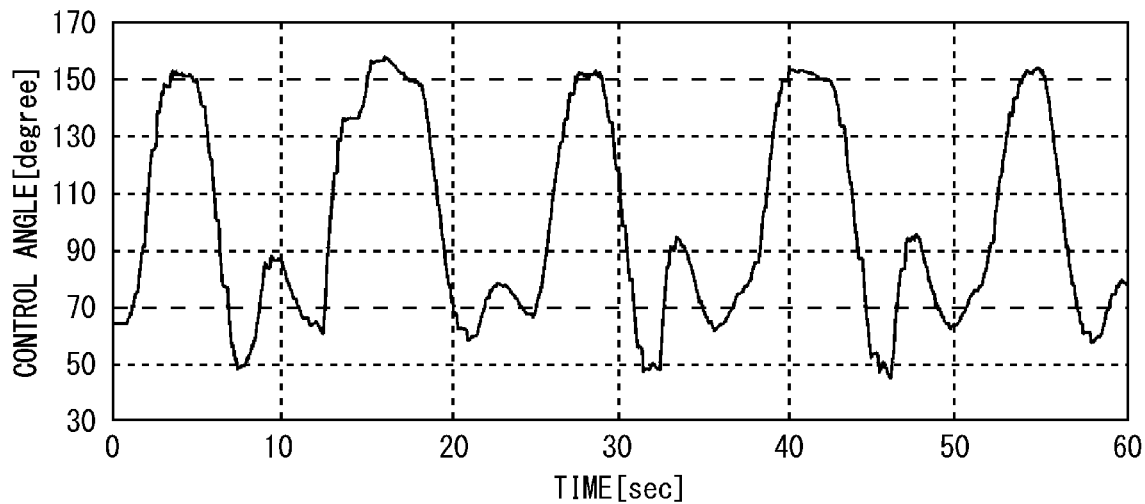
FIG. 8 is a graph for describing results of control in a case in which a bucket is controlled using the work control system according to the first example embodiment.
Figure 8:
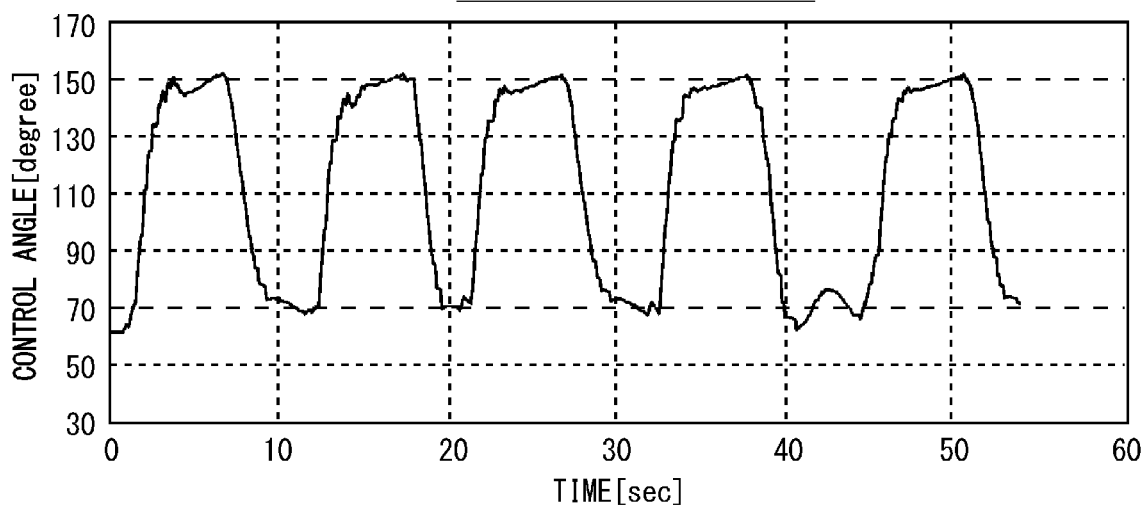

In the work control system 1 according to the first example embodiment, the second input value u'(t) computed in the simple feedback control using the input value correction unit 32 is suppressed using the correction amount s(t) and the second input value u'(t) after the correction is set as the first input value u(t). Accordingly, in the work control system 1 according to the first example embodiment, it is possible to achieve both suppression of overshoot of the movable part and an increase in the movable speed of the movable part. In order to explain this effect, FIG. 8 shows a graph for describing results of controlling the bucket 16 using the work control system 1 according to the first example embodiment. The example shown in FIG. 8 shows a time transition of the control angle of the bucket 16 when the bucket 16 is operated to reciprocate between the control angle of 70 degrees and the control angle of 150 degrees. Further, in FIG. 8, the lower stage shows results of the control of the work control system 1 according to the first example embodiment and the upper stage shows results of the control when the input value correction unit 32 is not used as a comparative example.

It can be seen from FIG. 8 that the work control system 1 according to the first example embodiment is able to allow the same number of reciprocating movements to be ended at an early timing while suppressing overshoot compared to the work control system according to the comparative example. Further, it is seen that, with the work control system 1 according to the first example embodiment, overshoot whose control angle is about 70 degrees can be significantly suppressed.

From the above description, with the work control system 1 according to the first example embodiment, it is possible to decelerate the movable part of the construction machine 10 to suppress overshoot in a part near the target value and to operate the movable part at a high speed without decelerating the movable part in a part away from the target value.

Further, the work control system 1 according to the first example embodiment is highly versatile since the work control system 1 is able to perform the aforementioned control without using a model decided for each type of the construction machine 10. Further, since the work control system 1 according to the first example embodiment performs the aforementioned control without using the derivative value of the posture detection value, it is possible to stabilize the control and to ensure a high safety level.

Second Example Embodiment

In a second example embodiment, an input value correction unit 42, which is another form of the input value correction unit 32, will be described. In the description of the second example embodiment, the components that are the same as those in the first example embodiment will be denoted by the same reference symbols as those attached to the components in the first example embodiment and the descriptions thereof will be omitted.

Figure 9:
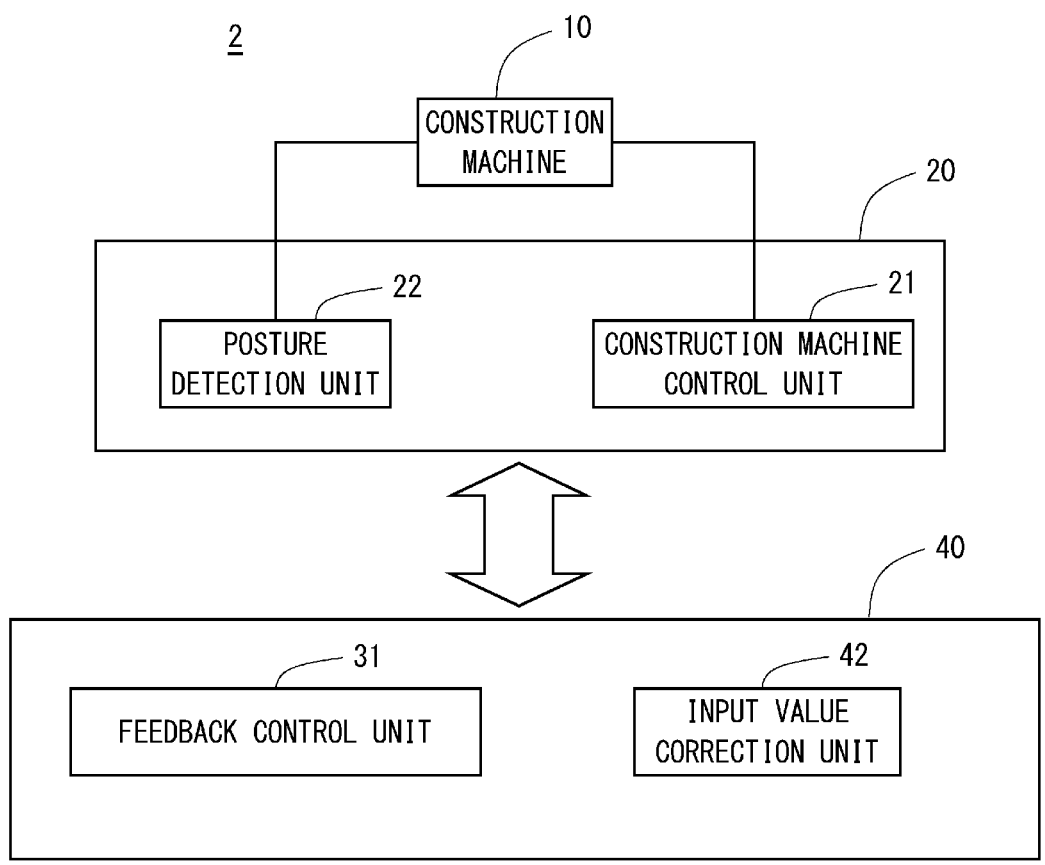
FIG. 9 is a schematic block diagram of a work control system according to a second example embodiment.

FIG. 9 shows a schematic block diagram of the work control system 2 according to the second example embodiment. In the work control system 2 according to the second example embodiment, the work control apparatus 30 of the work control system 1 is replaced by a work control apparatus 40. Further, in the work control apparatus 40, the input value correction unit 32 of the work control apparatus 30 is replaced by an input value correction unit 42. The input value correction unit 42 performs smoothing processing on the first input value input for each process cycle used in the correction amount computation step and computes a correction amount using the smoothed first input value.

Figure 10:
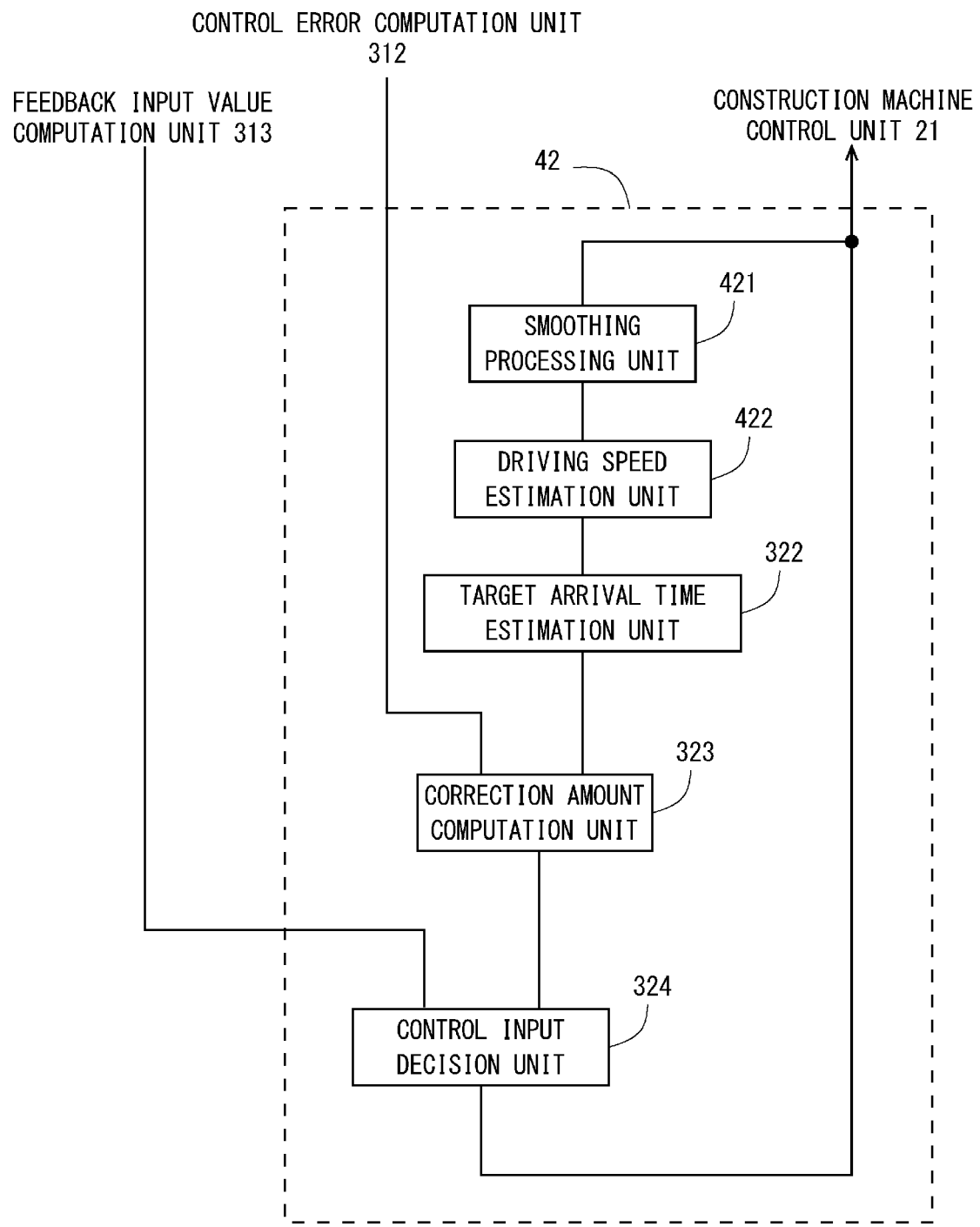
FIG. 10 is a block diagram of an input value correction unit according to the second example embodiment.

Next, FIG. 10 shows a block diagram of the input value correction unit 42 according to the second example embodiment and the input value correction unit 42 will be described in detail. As shown in FIG. 10, in the input value correction unit 42, a smoothing processing unit 421 is added to the components of the input value correction unit 32 and the driving speed estimation unit 321 is replaced by a driving speed estimation unit 422.

The smoothing processing unit 421 executes a smoothing processing step of computing the input smooth value in which the first input value up to the pre-process cycle is smoothed. The driving speed estimation unit 422 estimates the driving speed of the movable part based on the smooth input value and the maximum moving speed of the movable part. That is, in the driving speed estimation unit 422, the input value to be used for computation of the estimated value of the driving speed is replaced by the smooth input value computed from the first input value by the smoothing processing unit 421.

Figure 11:
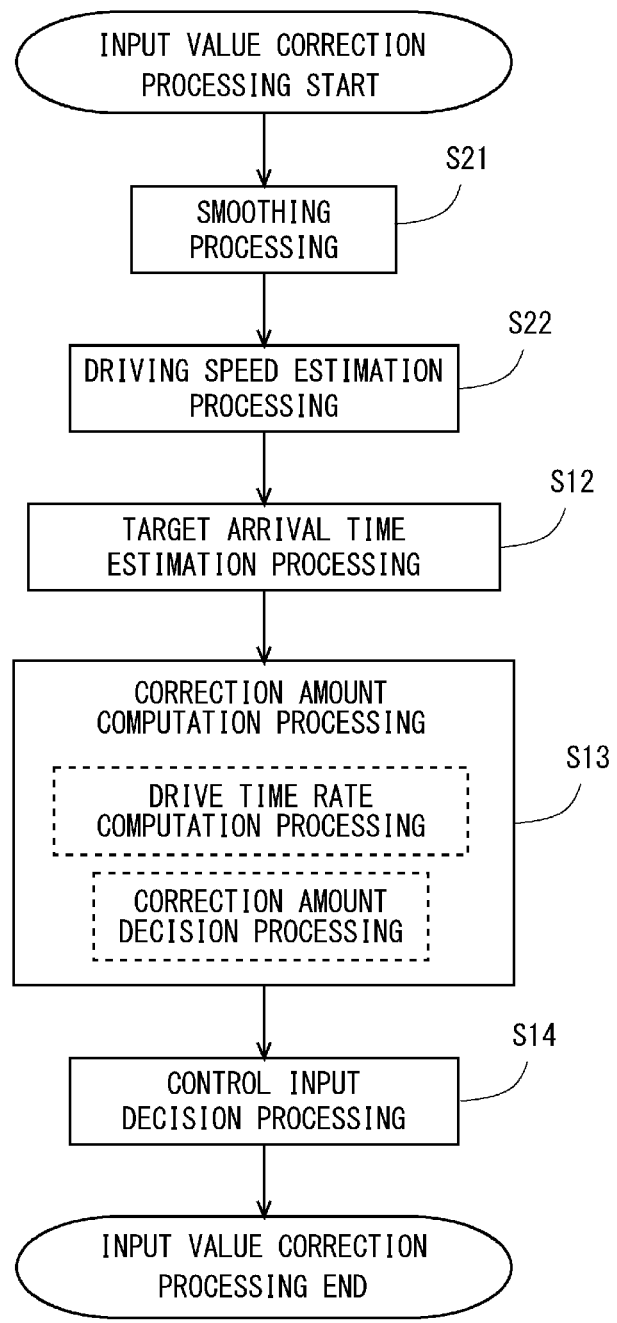
FIG. 11 is a flowchart for describing an operation of the input value correction unit according to the second example embodiment.

FIG. 11 shows a flowchart for describing an operation of the input value correction unit 42 according to the second example embodiment. As shown in FIG. 11, the operation of the input value correction unit 42 according to the second example embodiment is different from the operation of the input value correction unit 32 shown in FIG. 7 in that smoothing processing in Step S21 is added and the driving speed estimation processing in Step S11 is replaced by driving speed estimation processing in Step S22.

In the input value correction unit 42, first, smoothing processing for computing the input smooth value obtained by smoothing the first input value computed up to the pre-process cycle based on a predetermined coefficient is performed (Step S21). More specifically, in the smoothing processing, the input smooth value $u_s(t)$ in the current process cycle is computed using Expression (10). In this Expression (10), the input smooth value of the pre-process cycle is denoted by $u_s(t-1)$, the first input value of the pre-process cycle is denoted by $u(t-1)$, and the first coefficient is denoted by $\alpha$.

[Expression 10]

$$u_s(t) = \alpha u_s(t-1) + (1-\alpha)u(t-1) \quad (10)$$

It is seen from Expression (10) that the larger the smoothed first input value is, that is, the larger the driving speed is, the more the first input value is suppressed. Further, by smoothing the first input value in this manner, a suppression term for suppressing the second input value becomes small in a phase where the speed is low immediately after the operation.

Next, the input value correction unit 42 performs driving speed estimation processing in the driving speed estimation unit 422 (Step S22). In the driving speed estimation processing in Step S22, the input value rate computation processing in the driving speed estimation unit 321 is replaced by input smooth value rate computation processing. In the input smooth value rate computation processing, the rate of the input smooth value $u_s(t)$ in the range of change in the first input value is computed. Specifically, in the input smooth value rate computation processing, the input smooth value rate $r(t)$ is performed computed based on Expression (11).

[Expression 11]

$$r(t) = \max\left(\frac{u_s(t) - u_{th}}{u_{max} - u_{th}}, 0\right) \quad (11)$$

It is seen, from Expression (11), that the maximum value of the input smooth value $r(t)$ is 1 and the minimum value thereof is 0. Then, the driving speed estimation unit 422 applies the input smooth value rate $r(t)$ computed in Expression (11) to Expression (5) to obtain the estimated value of the driving speed.

From the aforementioned description, in the second example embodiment, the smoothing processing is applied to the first input value to be used for computation of the correction amount. Accordingly, with the work control system 2 according to the second example embodiment, it is possible to prevent a correction amount computed by a sudden change in the first input value from being unstable. Further, by stabilizing the correction amount, it is possible to stabilize the operation of the entire system. In the construction machine, noise that is superimposed on the posture detection value is large and a sudden large fluctuation often occurs in the first input value. Therefore, the effect of stabilizing the correction amount by the smoothing processing is significant.

Note that the present invention is not limited to the aforementioned example embodiments and may be changed as appropriate without departing from the spirit of the present invention. For example, the aforementioned invention includes the following aspects.

(Supplementary Note 1)

A work control method comprising:
a construction machine control step of driving a movable part of a construction machine based on a first input value input for each process cycle that is periodically repeated;
a posture detection step of detecting the position of the movable part as a posture detection value;
a feedback input value computation step of computing a second input value that reduces an error between a target value of the movable part and the posture detection value; and
an input value correction step of correcting the second input value by a correction amount computed based on the first input value and an estimated value of an arrival time for the movable part to reach the target value for each process cycle.

(Supplementary Note 2)

The work control method according to Supplementary Note 1, wherein the input value correction step includes:
a driving speed estimation processing step of estimating the driving speed of the movable part based on the first input value and a maximum moving speed of the movable part;
a target arrival time estimation processing step of estimating the arrival time based on an estimated value of the driving speed; and
a correction amount computation step of computing the correction amount that suppresses the second input value based on an estimated value of the arrival time.

(Supplementary Note 3)

The work control method according to Supplementary Note 2, wherein the correction amount computation step includes:
a drive time rate computation step of computing a drive time rate for computing the rate of the estimated value of the arrival time to a convergence maximum time set for the movable part; and
a correction amount decision step of deciding the correction amount based on the product of the drive time rate, a preset suppression rate, and the magnitude of a range of change in the first input value.

(Supplementary Note 4)

The work control method according to Supplementary Note 2 or 3, wherein
the input value correction step further includes a smoothing processing step of computing an input smooth value in which the first input value up to a pre-process cycle is smoothed, and
the driving speed estimation processing step computes an estimated value of the driving speed using the input smooth value as the first input value.

(Supplementary Note 5)

The work control method according to any one of Supplementary Notes 1 to 4, wherein, in the feedback input value computation step,
the minimum value of the second input value is set to be zero and the maximum value thereof is set to be a preset maximum input value, and
a value obtained by adding a preset minimum input value to a value obtained by multiplying the difference between the error and a preset allowable error amount by a preset gain value is computed as the second input value.

(Supplementary Note 6)

The work control method according to any one of Supplementary Notes 1 to 5, wherein the construction machine includes a plurality of the movable parts and executes the input value correction step using a parameter optimized for each of the movable parts.

(Supplementary Note 7)

A work control system comprising:
a construction machine control unit configured to drive a movable part of a construction machine based on a first input value input for each process cycle that is periodically repeated;
a posture detection unit configured to detect the position of the movable part as a posture detection value;
a feedback input value computation unit configured to compute a second input value that reduces an error between a target value of the movable part and the posture detection value; and
an input value correction unit configured to correct the second input value by a correction amount computed based on the first input value and an estimated value of an arrival time for the movable part to reach the target value for each process cycle.

(Supplementary Note 8)

The work control system according to Supplementary Note 7, wherein the input value correction unit includes:
a driving speed estimation unit configured to estimate the driving speed of the movable part based on the first input value and a maximum moving speed of the movable part;
a target arrival time estimation unit configured to estimate the arrival time based on an estimated value of the driving speed; and
a correction amount computation unit configured to compute the correction amount that suppresses the second input value based on an estimated value of the arrival time.

(Supplementary Note 9)

The work control system according to Supplementary Note 8, wherein the correction amount computation unit includes:
a drive time rate computation unit configured to compute a drive time rate for computing the rate of the estimated value of the arrival time to a convergence maximum time set for the movable part; and
a correction amount computation unit configured to compute the correction amount based on the product of the drive time rate, a preset suppression rate, and the magnitude of a range of change in the first input value.

(Supplementary Note 10)

The work control system according to Supplementary Note 8 or 9, wherein
the input value correction unit further includes a smoothing processing unit configured to compute an input smooth value in which the first input value up to a pre-process cycle is smoothed, and
the driving speed estimation unit computes an estimated value of the driving speed using the input smooth value as the first input value.

(Supplementary Note 11)

The work control system according to any one of Supplementary Notes 7 to 10, wherein, in the feedback input value computation unit,
the minimum value of the second input value is set to be zero and the maximum value thereof is set to be a preset maximum input value, and a value obtained by adding a preset minimum input value to a value obtained by multiplying the difference between the error and a preset allowable error amount by a preset gain value is computed as the second input value.

(Supplementary Note 12)

The work control system according to any one of Supplementary Notes 7 to 11, wherein the construction machine includes a plurality of the movable parts, and the input value correction unit computes the correction amount using a parameter optimized for each of the movable parts.

(Supplementary Note 13)

A work control apparatus comprising:
a construction machine control unit configured to drive a movable part of a construction machine based on a first input value input for each process cycle that is periodically repeated;
a posture detection unit configured to detect the position of the movable part as a posture detection value;
a feedback input value computation unit configured to compute a second input value that reduces an error between a target value of the movable part and the posture detection value; and
an input value correction unit configured to correct the second input value by a correction amount computed based on the first input value and an estimated value of an arrival time for the movable part to reach the target value for each process cycle.

(Supplementary Note 14)

The work control apparatus according to Supplementary Note 13, wherein the input value correction unit includes:
a driving speed estimation unit configured to estimate the driving speed of the movable part based on the first input value and a maximum moving speed of the movable part;
a target arrival time estimation unit configured to estimate the arrival time based on an estimated value of the driving speed; and
a correction amount computation unit configured to compute the correction amount that suppresses the second input value based on an estimated value of the arrival time.

(Supplementary Note 15)

The work control apparatus according to Supplementary Note 14, wherein the correction amount computation unit includes:
a drive time rate computation unit configured to compute a drive time rate for computing the rate of the estimated value of the arrival time to a convergence maximum time set for the movable part; and
a correction amount computation unit configured to compute the correction amount based on the product of the drive time rate, a preset suppression rate, and the magnitude of a range of change in the first input value.

(Supplementary Note 16)

The work control apparatus according to Supplementary Note 14 or 15, wherein
the input value correction unit further includes a smoothing processing unit configured to compute an input smooth value in which the first input value up to a pre-process cycle is smoothed, and
the driving speed estimation unit computes an estimated value of the driving speed using the input smooth value as the first input value.

(Supplementary Note 17)

The work control apparatus according to any one of Supplementary Notes 13 to 16, wherein, in the feedback input value computation unit,
the minimum value of the second input value is set to be zero and the maximum value thereof is set to be a preset maximum input value, and
a value obtained by adding a preset minimum input value to a value obtained by multiplying the difference between the error and a preset allowable error amount by a preset gain value is computed as the second input value.

(Supplementary Note 18)

The work control apparatus according to any one of Supplementary Notes 13 to 17, wherein the construction machine includes a plurality of the movable parts, and in the input value correction unit, the correction amount is computed using a parameter optimized for each of the movable parts.

(Supplementary Note 19)

A non-transitory computer readable medium storing a work control program executed by feedback control means of a work control system comprising:
construction machine control means for driving a movable part of a construction machine based on a first input value input for each process cycle that is periodically repeated;
posture detection means for detecting the position of the movable part as a posture detection value; and
feedback control means for generating the first input value by feedback control based on the posture detection value, wherein the work control program performs:
feedback input value computation processing for computing a second input value that reduces an error between a target value of the movable part and the posture detection value; and
input value correction processing for correcting the second input value by a correction amount computed based on the first input value computed in a pre-process cycle and an estimated value of an arrival time for the movable part to reach the target value.

(Supplementary Note 20)

The work control program according to Supplementary Note 19, wherein the input value correction processing includes:
driving speed estimation processing for estimating the driving speed of the movable part based on the first input value and a maximum moving speed of the movable part;
target arrival time estimation processing for estimating the arrival time based on an estimated value of the driving speed; and
correction amount computation processing for computing the correction amount that suppresses the second input value based on an estimated value of the arrival time.

(Supplementary Note 21)

The work control program according to Supplementary Note 20, wherein the input value correction processing performs:
drive time rate computation processing for computing a drive time rate for computing the rate of the estimated value of the arrival time to a convergence maximum time set for the movable part; and
correction amount computation processing for computing the correction amount based on the product of the drive time rate, a preset suppression rate, and the magnitude of a range of change in the first input value.

(Supplementary Note 22)

The work control program according to Supplementary Note 19 or 20, wherein
- the input value correction processing further includes smoothing processing for computing an input smooth value in which the first input value up to a pre-process cycle is smoothed, and
- the driving speed estimation processing computes an estimated value of the driving speed using the input smooth value as the first input value.

(Supplementary Note 23)

The work control program according to any one of Supplementary Notes 19 to 22, wherein, in the feedback input value computation processing,
- the minimum value of the second input value is set to be zero and the maximum value thereof is set to be a preset maximum input value, and
- a value obtained by adding a preset minimum input value to a value obtained by multiplying the difference between the error and a preset allowable error amount by a preset gain value is computed as the second input value.

(Supplementary Note 24)

The work control program according to any one of Supplementary Notes 19 to 23, wherein the construction machine includes a plurality of the movable parts, and in the input value correction processing, the correction amount is computed using a parameter optimized for each of the movable parts.

(Supplementary Note 25)

The work control program according to any one of Supplementary Notes 19 to 24, wherein, in the construction machine control means, the movable part is driven by displacing an actuator included in the construction machine and attached to a manipulation lever that an operator can manually operate in accordance with the first input value.

While the present invention has been described above with reference to the example embodiments, the present invention is not limited to the example embodiments. Various changes that can be understood by those skilled in the art can be made to the configurations and the details of the present invention within the scope of the present invention.

This application is based upon and claims the benefit of priority from Japanese Patent Application No. 2020-161974, filed on Sep. 28, 2020, the disclosure of which is incorporated herein in its entirety by reference.

REFERENCE SIGNS LIST

1 Work Control System
2 Work Control System
10 Construction Machine
11 Crawler
12 Turning Base
13 Cockpit
14 Boom
15 Arm
16 Bucket
17 Construction Machine Drive Processing Unit
181-184 Posture Sensor
20 Posture Control Apparatus
21 Construction Machine Control Unit
22 Posture Detection Unit
30 Work Control Apparatus
31 Feedback Control Unit
311 Work Instruction Unit
312 Control Error Computation Unit
313 Feedback Input Value Computation Unit
32 Input Value Correction Unit
321 Driving Speed Estimation Unit
322 Target Arrival Time Estimation Unit
323 Correction Amount Computation Unit
324 Control Input Decision Unit
40 Work Control Apparatus
42 Input Value Correction Unit
421 Smoothing Processing Unit
422 Driving Speed Estimation Unit

What is claimed is:

1. A work control method comprising:
- a construction machine control step of driving a movable part of a construction machine based on a first input value input for each process cycle that is periodically repeated;
- a posture detection step of detecting a position of the movable part as a posture detection value;
- a feedback input value computation step of computing a second input value that reduces an error between a target value of the movable part and the posture detection value; and
- an input value correction step of correcting the second input value by a correction amount computed based on the first input value and an estimated value of an arrival time for the movable part to reach the target value for each process cycle,
- wherein the input value correction step includes:
  - a driving speed estimation processing step of estimating the driving speed of the movable part based on the first input value and a maximum moving speed of the movable part;
  - a target arrival time estimation processing step of estimating the arrival time based on an estimated value of the driving speed; and
  - a correction amount computation step of computing the correction amount that suppresses the second input value based on an estimated value of the arrival time.

2. The work control method according to claim 1, wherein the correction amount computation step includes:
- a drive time rate computation step of computing a drive time rate for computing the rate of the estimated value of the arrival time to a convergence maximum time set for the movable part; and
- a correction amount decision step of deciding the correction amount based on the product of the drive time rate, a preset suppression rate, and the magnitude of a range of change in the first input value.

3. The work control method according to claim 1, wherein the input value correction step further includes a smoothing processing step of computing an input smooth value in which the first input value up to a pre-process cycle is smoothed, and
the driving speed estimation processing step computes an estimated value of the driving speed using the input smooth value as the first input value.

4. The work control method according to claim 1, wherein, in the feedback input value computation step,
a minimum value of the second input value is set to be zero and a maximum value thereof is set to be a preset maximum input value, and
a value obtained by adding a preset minimum input value to a value obtained by multiplying the difference between the error and a preset allowable error amount by a preset gain value is computed as the second input value.

5. The work control method according to claim 1, wherein the construction machine includes a plurality of the movable parts and executes the input value correction step using a parameter optimized for each of the movable parts.

6. A work control system comprising:
a construction machine control unit for driving a movable part of a construction machine based on a first input value input for each process cycle that is periodically repeated;
a posture detection unit for detecting the a position of the movable part as a posture detection value;
a feedback input value computation unit for computing a second input value that reduces an error between a target value of the movable part and the posture detection value; and
an input value correction unit for correcting the second input value by a correction amount computed based on the first input value and an estimated value of an arrival time for the movable part to reach the target value for each process cycle,
wherein the input value correction unit includes:
a driving speed estimation unit for estimating the driving speed of the movable part based on the first input value and a maximum moving speed of the movable part;
a target arrival time estimation unit for estimating the arrival time based on an estimated value of the driving speed; and
a correction amount computation unit for computing the correction amount that suppresses the second input value based on an estimated value of the arrival time.

7. The work control system according to claim 6, wherein the correction amount computation unit includes:
a drive time rate computation unit for computing a drive time rate for computing the rate of the estimated value of the arrival time to a convergence maximum time set for the movable part; and
a correction amount computation unit for computing the correction amount based on the product of the drive time rate, a preset suppression rate, and the magnitude of a range of change in the first input value.

8. The work control system according to claim 6, wherein the input value correction unit further includes smoothing processing unit for computing an input smooth value in which the first input value up to a pre-process cycle is smoothed, and
the driving speed estimation unit computes an estimated value of the driving speed using the input smooth value as the first input value.

9. The work control system according to claim 6, wherein, in the feedback input value computation unit,
a minimum value of the second input value is set to be zero and a maximum value thereof is set to be a preset maximum input value, and
a value obtained by adding a preset minimum input value to a value obtained by multiplying the difference between the error and a preset allowable error amount by a preset gain value is computed as the second input value.

10. The work control system according to claim 6, wherein the construction machine includes a plurality of the movable parts, and the input value correction unit computes the correction amount using a parameter optimized for each of the movable parts.

11. A work control apparatus comprising:
a construction machine control unit for driving a movable part of a construction machine based on a first input value input for each process cycle that is periodically repeated;
a posture detection unit for detecting the a position of the movable part as a posture detection value;
a feedback input value computation unit for computing a second input value that reduces an error between a target value of the movable part and the posture detection value; and
an input value correction unit for correcting the second input value by a correction amount computed based on the first input value and an estimated value of an arrival time for the movable part to reach the target value for each process cycle,
wherein the input value correction unit includes:
a driving speed estimation unit for estimating the driving speed of the movable part based on the first input value and a maximum moving speed of the movable part;
a target arrival time estimation unit for estimating the arrival time based on an estimated value of the driving speed; and
a correction amount computation unit for computing the correction amount that suppresses the second input value based on an estimated value of the arrival time.

12. The work control apparatus according to claim 11, wherein the correction amount computation unit includes:
a drive time rate computation unit for computing a drive time rate for computing the rate of the estimated value of the arrival time to a convergence maximum time set for the movable part; and
a correction amount computation unit for computing the correction amount based on the product of the drive time rate, a preset suppression rate, and the magnitude of a range of change in the first input value.

13. The work control apparatus according to claim 11, wherein
the input value correction unit further includes smoothing processing unit for computing an input smooth value in which the first input value up to a pre-process cycle is smoothed, and
the driving speed estimation unit computes an estimated value of the driving speed using the input smooth value as the first input value.

14. The work control apparatus according to claim 11, wherein, in the feedback input value computation unit,
a minimum value of the second input value is set to be zero and a maximum value thereof is set to be a preset maximum input value, and
a value obtained by adding a preset minimum input value to a value obtained by multiplying the difference between the error and a preset allowable error amount by a preset gain value is computed as the second input value.

15. The work control apparatus according to claim 11, wherein the construction machine includes a plurality of the movable parts, and in the input value correction unit, the correction amount is computed using a parameter optimized for each of the movable parts.

* * * * *